3,089,772
COFFEE EXTRACTION PROCESS
Howard J. Bowden, New City, and Henry G. Schwartzberg, Hartsdale, N.Y., assignors to General Foods Corporation, White Plains, N.Y., a corporation of Delaware
Filed July 25, 1960, Ser. No. 45,159
7 Claims. (Cl. 99—71)

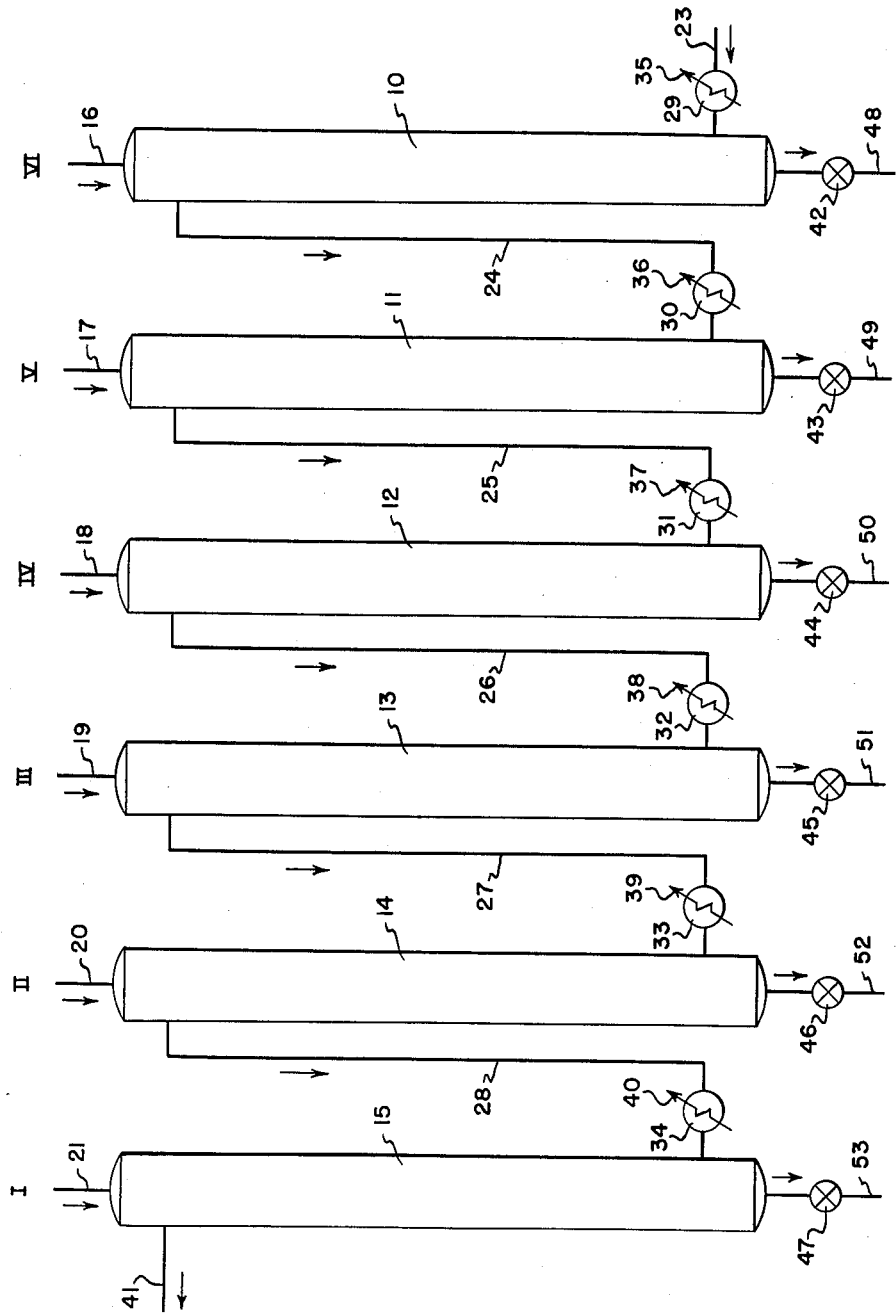

This invention relates to a process for obtaining an aqueous, extract of soluble coffee. More specifically, it relates to an improved technique for obtaining an aqueous extract particularly characterized by superior taste, aroma, and flavor; by its high similarity to brewed coffee beverages and by its high degree of acceptance by coffee consumers.

As is well known to those skilled in the art, ground roasted coffee may be contacted with preferably warm or boiling water, to extract coffee solubles. The extract liquors from such an extraction operation may then be dried by one of several more or less conventional drying techniques including for example spray drying, drum drying, etc.

In measuring the efficacy of a coffee extraction operation, it is common to make various tests on the product soluble powder which may be obtained. The difficulties of analyzing for various naturally occurring chemical ingredients in coffee has made it impossible to rely on chemical analyses and accordingly the determination of desirability of coffee is commonly done by tasting, usually in so-called consumer or panel tests in which tasters express their preference for the product. Experience has long indicated that this testing technique is fully correlative with ultimate acceptance by the coffee-drinking public.

It has been generally appreciated that the aqueous extraction liquor drawn off from the coffee extraction system may reveal the characteristics of the dry, soluble product which may be prepared therefrom; accordingly it is common to test this draw-off liquor to determine the character of the soluble powder which may be produced therefrom.

In practice, instant or soluble coffee may be prepared commercially by passing water through a bed of ground roasted coffee in a percolator or extraction column. When water is passed through a single bed of coffee grounds, the concentration of solubles in the extract is low, usually only a few percent, and accordingly it is necessary to pass this dilute extract through additional beds of coffee grounds in subsequent percolators to get higher concentrations of coffee solubles in the extract liquor. The process may be conducted semi-continuously in counter-current manner so that fresh extracting liquor (commonly water) enters the system at one end and is continuously concentrated as it contacts fresher coffee grounds in successive percolators. Each percolator is initially filled with a bed of fresh coffee grounds which is effectively moved through the system. When the content of solubles in the bed of the percolator has been lowered to the desired point, at which time that percolator will be the last stage, that percolator is disconnected from the system and spent coffee grounds withdrawn therefrom. Simultaneously a freshly filled percolator is placed on stream at the other end as the new first stage of the series of percolators, that percolator which formerly was the first stage now becoming the second stage, etc.

The stages of extraction are generally designated as coffee-stages, i.e., the stage wherein the most concentrated extraction liquor contacts fresh coffee grounds is designated the first coffee stage, and that wherein the fresh extraction liquor contacts substantially spent coffee grounds is designated the last coffee stage. It will thus be apparent that the first percolator, expressed in terms of liquid flow, will be the last stage.

When solubles are extracted from the coffee bean by hot water according to prior art processes, the feed water may generally be initially heated to as high a temperature as is possible or desirable under the conditions of operation, and admitted to the last stage of a series of percolators. As the water passes through each percolator, temperature drops and the temperature profile curve over the entire operation gradually slopes downwardly. This more or less standard profile curve may be modified to some extent by increasing or decreasing the temperature of the feed water which raises or lowers the profile curve as it is customarily plotted in terms of temperature as the dependent variable against time as the independent variable.

When the concentrated infusion is dried, as by spray drying, to recover the soluble coffee solids in the form of powder, the amount of heat which must be supplied to the drying operation to effect evaporation of the large quantities of water vaporized is substantial. For example, when the extract liquor contains 25% solubles, the drier must evaporate three pounds of water for each pound of soluble coffee powder produced. An increase in the concentration of soluble coffee solids in the draw-off has been generally thought to be desirable as it permits decreased handling cost and greater throughput with existing driers, i.e. production of larger amounts of soluble coffee powder per pound of water evaporated in the drier.

It is an object of this invention to extract solubles from coffee under conditions which permit attainment of maximum quality coffee flavor in the draw-off or extract liquor. Other objects of this invention will be apparent to those skilled in the art on inspection of the following description and accompanying drawings.

In accordance with this invention an extract of high quality soluble coffee solids may be obtained in a percolation train by a coffee extraction process for producing a coffee extract by contacting progressively fresher coffee grounds counter-currently with an aqueous extraction liquor which comprises admitting extraction liquor at 270° F.–320° F. to a washing section of an extraction train containing nearly spent grounds at the liquor inlet end, withdrawing partially concentrated extraction liquor from said washing section, passing said partially concentrated extraction liquor through a cooling section of said extraction train, withdrawing extraction liquor from said cooling section, passing said extraction liquor through an extracting section of said extraction train, withdrawing extraction liquor from said extracting section, and maintaining a high water ratio in said percolation train whereby said extract possesses a high degree of consumer acceptance.

In accordance with a more specific embodiment of this invention, an extract of high quality soluble coffee solids may be obtained in a percolation train by a coffee extraction process for producing coffee extract by contacting progressively fresher coffee grounds counter-currently with an aqueous extraction liquor which comprises admitting extraction liquor at 270° F.–320° F. to a washing section of an extraction train containing nearly spent grounds at the liquor inlet end, withdrawing partially concentrated extraction liquor from said washing section, passing said partially concentrated extraction liquor at temperature of 270° F.–300° F. through a cooling section of said extraction train, withdrawing extraction liquor from said cooling section at temperature of 250° F.–265° F. passing said extraction liquor through an extracting section of said extraction train, withdrawing extraction liquor having a concentration of 8%–12% at temperature of 150° F.–245° F. and maintaining the water ratio in said percolation train above about 5.4 whereby said concentrated extract possesses a high degree of consumer acceptance.

It is a particular feature of this invention that the coffee to be extracted will be roasted coffee and preferably ground roasted coffee will be employed. This process is particularly adapted to be employed in connection with percolators and accordingly the ground roasted coffee may be packed in percolators through which the water and extraction liquor may pass.

Preferably the charge extraction liquor admitted to the first percolator in the percolation train (in which the last stage of extraction occurs) will be water but it may be a dilute, aqueous extraction liquor containing soluble coffee from any convenient source. It is a particular feature of the process of this invention that it is characterized by a high water ratio, i.e. the ratio of the weight of feed water admitted to the percolation train during a given cycle to the weight of coffee in a single percolator. Commonly this ratio may range from 5.4 to 6.9, preferably 5.9 to 6.0. A preferred value of the ratio may be 5.9 pounds of water per pound of coffee. It will be apparent to those skilled in the art that this water rate is high. Generally, as is well known, the water ratio in prior art processes is substantially less than the lower, preferred limit of this range; and commonly it may be 3.7 or less. Use of the preferred water ratios permits operation under conditions such that the period of time during which the extraction liquor may be in contact with the coffee grounds is advantageously decreased by 25% to 50% to typically 60 to 85 minutes. This minimizes possible autoclaving with resulting development of undesirable taste characteristics in the extract liquor.

It is a feature of the process of this invention that it is possible to obtain a particularly superior soluble coffee. The soluble coffee product prepared in accordance with this invention is found to be preferred by a significant percentage of consumers who drink coffee.

In the preferred embodiment, the feed wtaer or inlet liquor to the last or most spent stage of the percolation train may be at a temperature of 270° F. to 320° F.

In the high temperature embodiment (and it will be noted that the terms "high-temperature" and "low temperature" refer to comparative conditions which prevail at the liquor outlet end of the system) of this invention, the feed water or inlet liquor temperature to the percolation train may be 270° F. to 300° F., preferably 280° F. to 290° F., say 290° F., and operation under these conditions will give a product which is particularly preferred by some consumers of coffee.

In the low temperature embodiment of this invention, the feed water or inlet liquor temperature to the percolation train may be preferably about 300° F. to 320° F., say 309° F., and operation under these conditions will give a product which has a high general acceptance.

It will be apparent that the pressures prevailing within this first percolator and other percolators in the train will be at least equal to the equilibrium vapor pressure prevailing at the noted temperature whereby the water and/or the extraction liquor will be continuously maintained in liquid phase as it passes through the system.

It is convenient to divide the percolation train of this invention into three sections. These may be called a washing section, a cooling section, and an extracting section. In the first section, immediately adjacent to the liquor feed, the temperature is generally high; usually above about 270° F. to 275° F.; the rate of decrease of temperature is moderate, the curve being more-or-less flat; and the operations occurring in this section include creation of soluble matter by autoclaving hydrolysis reactions, the washing out of these solubles and the washing out of some residual solubles remaining after low temperature extraction.

The liquor leaving the first or washing or autoclaving section in the high temperature embodiment of this process may be at temperature of 270° F. to 280° F., say 284° F.; in the low temperature embodiment the corresponding temperature may be 280° F. to 300° F., say 290° F. Commonly the temperature drop across the first section may for example be 15° F. to 25° F., say 20° F. for the high temperature embodiment and 25° F. to 45° F. say 35° F. in the low temperature embodiment.

The extraction time (i.e. the time of residence of coffee grounds) in this first section may range from 40 to 90 minutes, preferably about 75 minutes. (The total extraction time may be about 100–200 minutes, say 165 minutes for the over-all cycle.) The extraction liquor leaving this first section may contain 2% to 5%, e.g. 3% coffee solubles. Although operation in this first section may be effected in a single percolator, it is preferred that several (preferably 3) percolators be employed.

Effluent from the first section may be admitted to a second section wherein it is cooled to temperature less than the outlet temperature of the first section as it is contacted with fresher coffee grounds. During its passage through this intermediate percolation section, the temperature of the infusion may be lowered by contact with the cooler coffee grounds and cooler percolators, by natural convection or by any one or more of these so that the extract liquor passing through this intermediate section of the percolation train may be cooled to a temperature of 265° F. to 250° F., typically about 255° F.

In the high temperature embodiment of this invention, the temperature of the liquors leaving this intermediate or cooling section may be 250° F. to 265° F., say 255° F.; in the low temperature embodiment of this invention, the temperature of the liquors leaving this section may be 255° F. to 265° F., say 260° F. The profile of temperature across the intermediate section will be steep. Extraction time in this intermediate section may be 25 minutes to 50 minutes, preferably about 30 minutes. The concentration of solubles in the effluent from this intermediate section may commonly be in the order of 3% to 7% and most commonly 4% to 5%.

Effluent from the intermediate section may be admitted to a third or extraction section wherein the liquor may be cooled to temperature less than the outlet temperature of the intermediate section as it is contacted with fresher coffee grounds, the coffee grounds in the last percolator of this section being fresh coffee. During its passage through this last section, the temperature of the extract liquor may be lowered by 15° F. to 90° F. It will be apparent that because the last column in this section is a fresh column, its initial temperature will be considerably lower than its final temperature during the cycle, and accordingly the draw-off temperature will be comparatively low.

Draw-off temperature may be read at the end of the draw-off, this being done because the temperature at the beginning of draw-off is low and erratic due to the fact that the percolator and the pipes are not yet at an equilibrium temperature.

If it be desired to produce a product extract liquor which is characterized particularly by its high acceptability, the percolation will be controlled so that the draw-off temperature of liquor leaving the last percolator will be preferably 215° F. to 245° F., preferably 230° F. It is a particular feature of this invention, however, that if it be desired to produce a product draw-off concentrated extract liquor which has maximum acceptability to coffee consumers, then temperature conditions in this last section of the percolation train should be controlled preferably by provision of appropriate cooling heat exchangers in the inlet line thereto so that the temperature of the draw-off therefrom may be 150° F. to 180° F., preferably 175° F. Preferably the temperature drop in either case will be accomplished to a large extent at least by natural convection. The preferred temperature drop across the last section may be 15° F. to 40° F., say 30° F. for the high temperature embodiment; and 60° F. to 90° F., say 70° F. for the low temperature embodiment. Extraction time in this last section may be 40 minutes to 100 minutes, preferably about 60 minutes. The concentration of solubles in the effluent or draw-off from this section may be as high as 8% to 12%, preferably 10%. It will be apparent that the concentration at this point, as well as the concentrations at other points will vary during the course of a run and the draw-off concentration to which reference has been made may be the average concentration of a batch of accumulated draw-off liquor which has been gathered during a run. It will be apparent that the outlet temperature of the high temperature embodiment of this invention will be higher than that of the low temperature embodiment of this invention.

Because of the semi-continuous nature of the process, it will also be apparent to those skilled in the art that the temperatures in a given percolator and in each section will vary from time to time. For example, when a percolator containing fresh coffee grounds is placed on stream, the temperature in that percolator will be lower than it will be after the infusion has been passing therethrough for some period of time. Accordingly, the noted temperatures are those prevailing just prior to the time when the last percolator is blown down. Similarly, temperatures referred to elsewhere in this specification are also noted just prior to blow down except for the draw-off temperature which is recorded at the end of draw-off as hereinbefore noted.

It will be apparent to those skilled in the art that the concentrated extract so-prepared may be reduced to solid form by drying in any one of numerous pieces of apparatus. It may, for example, be passed through a spray dryer; it may be dried by drum drying, etc.

In order to illustrate the process, a preferred method of operation will be described in connection with the attached drawing which illustrates a flow sheet of one embodiment according to which the process may be conducted. It will be understood by those skilled in the art that various modifications and changes may be made, and that the attached drawings and the following description are illustrative only.

In the drawing a pluraltiy of percolators or extraction columns 10, 11, 12, 13, 14, and 15, are shown. Each percolator contains therewithin a screen (not shown) at the bottom thereof and a suitable screening device (also not shown) positioned in the upper part of the percolator whereby coffee is prevented from being carried out of the bed by the upflowing extraction liquor. Each percolator has at its upper end a charge line 16, 17, 18, 19, 20, and 21, schematically shown, through which fresh charge coffee may be admitted to the percolator. The lower portion of each of the percolators is fitted with a coffee discharge or blow-down line 48, 49, 50, 51, 52, and 53, through which coffee may be removed from the column when the appropriate blow-down valve 42, 43, 44, 45, 46 or 47 is opened.

Each percolator has a liquid inlet line 23, 24, 25, 26, 27, and 28, leading to the lower portion thereof. Each of the percolators is also fitted with a liquid outlet line leading from the top thereof. The outlet line from each percolator connects directly with the inlet line to the next succeeding percolator, whereby as liquid flows respectively through percolators 10, 11, 12, 13, 14, and 15, it passes through lines 23, 24, 25, 26, 27, 28 and is discharged from the system through line 41.

Each percolator is fitted with a heat exchanger 29, 30, 31, 32, 33 and 34, which may be an intra-columnar heat exchanger, but preferably it will be positioned in the liquid inlet lines just before they enter the percolators. Each heat exchanger is provided with a heat exchange fluid line 35, 36, 37, 38, 39, and 40, through which appropriate heat exchange medium, e.g. cooling water or steam as hereinafter described, may be passed to modify the temperature of liquid admitted to the percolator. During a particular sequence of operations some of the heat exchangers may not be employed. It will be understood that although the drawing shows a system containing six percolators, the number may be varied depending upon the prevailing conditions.

In the drawing, the coffee stages have been designated by roman numerals I through VI. In describing the liquid flow through the system, reference will occasionally be made herein to the first percolator, and it will be understood that percolator 10 is referred to although this will be the last coffee stage.

*Example 1*

In typcal operation of the process according to the so-called high temperature embodiment, extraction of coffee solubles was effected in the six-column system set forth in the drawing. Each column was originally charged with 100 pounds of ground, roasted, blended, coffee.

It will be apparent to those skilled in the art that when starting up such a system, a certain period of time is required to bring the system to equilibrium, i.e. to attain steady operating conditions. Under conditions which prevail during steady operation of the process, feed water admitted through line 23 at pressure of about 200 p.s.i.g. was heated by steam from line 35 and heat exchanger 29 to 290° F. This water was admitted to the percolation train. The coffee grounds contained within percolator 10 were nearly spent coffee grounds which had the major portion of their solubles extracted therefrom. The coffee grounds in this percolator (and in each of the subsequent percolators herein described) were contacted with extraction liquor for a total period of about 165 minutes between filling and blow-down. The charge liquor leaving percolator 10 in this embodiment contained 2% by weight of soluble coffee and had a temperature of 275° F.

The extract was passed through line 24 to percolator 11 of the percolator train. It was heated in heat exchanger 30 by steam from line 36 to temperature of 295° F. and then admitted to percolator 11. Here it passed upwardly through a bed of coffee grounds which were fresher, i.e. which contained more solubles than the coffee in percolator 10. Draw-off from the top of percolator 11, containing 3% coffee solubles therein, was passed through line 25 to heat exchanger 31, wherein it was heated by steam from line 37 to temperature of 288° F. This hot extraction liquor was passed upwardly through percolator 12 and left the same through line 26 at concentration of 4% coffee solubles. Heating in heat exchanger 32, by steam from line 38 raised the temperature of the extraction liquor to 275° F. The heated liquor was thence passed upwardly through the bed of coffee in percolator 13 and was therein concentrated to 5% coffee solubles.

Extraction liquor, containing 5% coffee solubles, was then passed to the third or extracting section of the extraction train comprising percolators 14 and 15. This liquor was passed through line 27 to percolator 14. As admitted thereto, the liquor was at temperature of 261° F. Although cooling in the cold section of the extraction train may be effected by heat exchangers 33 and 34, they were not used in this example. Cooling was obtained by natural convection. The extract was contacted with coffee grounds in percolator 14, the effluent from which in line 28 contained about 6.5% solubles. Extraction liquor at 245° F. was passed upwardly through percolator 15. Here the upflowing extraction liquor contacted coffee grounds which were substantially fresh.

Draw-off in line 41 from percolator 15 was at temperature (at end of draw-off) of 226° F. Total time of contact of coffee grounds with the extracting liquor in the third section of the percolation train of this example was 60 minutes. Concentration of solubles in the draw-off was 9.9%.

During the course of this example, the ratio of the weight of feed water admitted to the percolation train during a given cycle to the weight of ground coffee in a single percolator was 5.9. Powdered coffee, produced by spray drying the draw-off infusion, had a desirably dark color. Pressure in the several percolators was adequate to maintain liquid phase operations therewithin.

The draw-off extract liquor obtained in this operation may be referred to as the high temperature dilute extraction.

*Example 2*

In typical operation of the process according to the so-called low temperature embodiment, extraction of coffee solubles was effected in the six-column system set forth in the drawing. Each column was originally charged with 100 pounds of ground, roasted blended coffee.

It will be apparent to those skilled in the art that when starting up such a system, a certain period of time is required to bring the system to equilibrium, i.e. to attain steady operating conditions. Under conditions which prevail during steady operation of the process, feed water admitted through line 23 at pressure of about 200 p.s.i.g. was heated by steam from line 35 and heat exchanger 29 to 309° F. This water was admitted to the percolation train. The coffee grounds contained within percolator 10 were nearly spent coffee grounds which had the major portion of their solubles extracted therefrom. The coffee grounds in this percolator (and in each of the subsequent percolators herein described) were contacted with extraction liquor for a total period of about 165 minutes between filling and blow-down. The charge liquor leaving percolator 10 in this embodiment contained 2% by weight of soluble coffee.

The extract was passed through line 24 to percolator 11 of the percolator train. It was heated in heat exchanger 30 by steam from line 36 to temperature of 299° F. and then admitted to percolator 11. Here it passed upwardly through a bed of coffee grounds which were fresher, i.e. which contained more solubles than the coffee in percolator 10. Draw-off from the top of percolator 11 containing 2.5% coffee solubles therein was passed through line 25 to heat exchanger 31, wherein it was heated by steam from line 37 to temperature of 284° F. This hot extraction liquor was passed upwardly through percolator 12 and left the same through line 26 at concentration of 3.3% coffee solubles. Heating in heat exchanger 32, by steam from line 38 raised the temperature of the extraction liquor to 272° F. The heated liquor was thence passed upwardly through the bed of coffee in percolator 13 and was therein concentrated to 4.0% coffee solubles.

Extraction liquor, containing 4.0% coffee solubles, was then passed to the cold section of the extraction train comprising percolators 14 and 15. This liquor was passed through line 27 to percolator 14. As admitted thereto, the liquor was at temperature of 252° F. Cooling in the cold section of the extraction train was effected by heat exchangers 33 and 34. The extract was contacted with coffee grounds in percolator 14, the effluent from which in line 28 contained about 5% solubles. Extraction liquor at 171° F. was passed upwardly through percolator 15. Here the upflowing extraction liquor contacted coffee grounds which were substantially fresh.

Draw-off in line 41 from percolator 15 was at temperature (at end of draw-off) of 174° F. Total time of contact of coffee grounds with the extracting liquor in the cooling section of the percolation train of this example was 60 minutes. Concentration of solubles in the draw-off was 10.0%.

During the course of this example, the ratio of the weight of feed water admitted to the percolation train during a given cycle to the weight of ground coffee in a single percolator was 5.8. Powdered coffee, produced by spray drying the draw-off infusion, had a desirably dark color. Pressure in the several percolators was adequate to maintain liquid phase operations therewithin.

The draw-off extract liquor obtained in Example 1 is referred to as the high temperature dilute extract. The effluent or draw-off liquor obtained by this Example 2 may be referred to as the low temperature dilute extract.

In order to test the acceptability of the extract liquor prepared by the high temperature dilute extraction technique, a standard was prepared. This standard was prepared by taking the extract liquor from plant operations which liquor is commonly dried to produce the standard soluble coffee powder of commerce. The standard draw-off liquor was diluted to cup strength and heated to 160° F. Similarly the high temperature dilute extraction extract liquor was diluted to cup strength (about 1% soluble solids) and heated to the same temperature of 160° F. It was found that among many consumers, there was a marked preference for the dilute high temperature extract.

Similar testing of a low temperature dilute extraction draw-off liquor against the high temperature dilute extraction draw-off liquor and the standard, indicated that among all consumers the extract liquor prepared by the low temperature dilute extraction technique was preferred by a statistically significant margin.

Although it is not completely certain why the products prepared in accordance with the instant invention should be so much more favorably received by the consumer than the so-called control or standard coffee of commerce, it appears that this may be because of the favorable conditions which prevail within the percolation train during the extraction. It may particularly result from the high ratio of water to coffee within the system; the comparatively low temperature level prevailing during the majority of the time that the extract liquor is passing through the columns; and the comparatively high recovery and low concentrations of solubles in the extract liquor as it passes through the percolation train.

Although reference has been herein made to certain specific embodiments of this invention, it will be apparent to those skilled-in-the-art that various changes and modifications may be made thereto which fall within the scope of this invention.

What is claimed is:

1. A coffee extraction process for producing a coffee extract by contacting progressively fresher coffee grounds counter-currently with an aqueous extraction liquor which comprises admitting extraction liquor at 270° F.–320° F. to a washing section of an extraction train containing nearly spent grounds at the liquor inlet end, withdrawing partially concentrated extraction liquor from said washing section after 40–90 minutes, passing said partially concentrated extraction liquor through a cooling section of said extraction train, withdrawing extraction liquor from said cooling section at 250° F. to 265° F. after 25–50 minutes passing said extraction liquor through an extracting section of said extraction train, withdrawing extraction liquor having a concentration of 8–12% coffee solubles from said extracting section, at 150° F. to 245° F. after 40–100 minutes and maintaining a high water ratio between about 5.4 and 6.9 parts of water per part by weight of the coffee in said percolation train whereby said extract possesses a high degree of consumer acceptance.

2. A coffee extraction process for producing coffee extract by contacting progressively fresher coffee grounds counter-currently with an aqueous extraction liquor which comprises admitting extraction liquor at 270° F.–320° F. to a washing section of an extraction train containing nearly spent grounds at the liquor inlet end, withdrawing partially concentrated extraction liquor from said washing section after 40–90 minutes, passing said partially concentrated extraction liquor at temperature of 270°

F.–300° F. through a cooling section of said extraction train, withdrawing extraction liquor from said cooling section at temperature of 250° F.–265° F. after 25–50 minutes, passing said extraction liquor through an extracting section of said extraction train, withdrawing extraction liquor having a concentration of 8%–12% coffee solubles at temperature of 215° F.–245° F. after 40–100 minutes, and maintaining the water ratio in said percolation train between about 5.4 and 6.9 parts of water per part by weight of the coffee whereby said extract possesses a high degree of consumer acceptance.

3. A coffee extraction process for producing coffee extract by contacting progressively fresher coffee grounds counter-currently with an aqueous extraction liquor which comprises admitting extraction liquor at 270° F.–300° F. to a washing section of an extraction train containing nearly spent grounds at the liquor inlet end, withdrawing partially concentrated extraction liquor from said washing section after 40–90 minutes, passing said partially concentrated extraction liquor at temperature of 270° F.–280° F. through a cooling section of said extraction train, withdrawing extraction liquor from said cooling section at temperature of 250° F.–265° F. after 25–50 minutes, passing said extraction liquor through an extracting section of said extraction train, withdrawing extraction liquor having a concentration of 8%–12% coffee solubles at temperature of 215° F.–245° F. after 40–100 minutes, and maintaining the water ratio in said percolation train between about 5.4 and 6.9 parts of water per part by weight of the coffee whereby said extract possesses a high degree of consumer acceptance.

4. A coffee extraction process for producing coffee extract by contacting progressively fresher coffee grounds counter-currently with an aqueous extraction liquor which comprises admitting extraction liquor at 290° F. to a washing section of an extraction train containing nearly spent grounds at the liquor inlet end, withdrawing partially concentrated extraction liquor from said washing section after 75 minutes, passing said partially concentrated extraction liquor at temperature of 284° F. through a cooling section of said extraction train, withdrawing extraction liquor from said cooling section at temperature of 255° F. after 30 minutes, passing said extraction liquor through an extracting section of said extraction train, withdrawing extraction liquor having a concentration of 10% coffee solubles at temperature of 230° F., after 60 minutes, and maintaining the water ratio in said percolation train between about 5.4 and 6.9 parts of water per part by weight of the coffee whereby said extract possesses a high degree of consumer acceptance.

5. A coffee extract process for producing coffee extract by contacting progressively fresher coffee grounds counter-currently with an aqueous extraction liquor which comprises admitting extraction liquor at 270° F.–320° F. to a washing section of an extraction train containing nearly spent grounds at the liquor inlet end, withdrawing partially concentrated extraction liquor from said washing section after 40–90 minutes, passing said partially concentrated extraction liquor at temperature of 270° F.–300° F. through a cooling section of said extraction train, withdrawing extraction liquor from said cooling section at temperature of 250° F.–265° F. after 25–50 minutes, passing said extraction liquor through an extracting section of said extraction train, withdrawing extraction liquor having a concentration of 8%–12% coffee solubles at temperature of 150° F.–180° F. after 40–100 minutes, and maintaining the water ratio in said percolation train between about 5.4, and 6.9 parts of water per part by weight of the coffee whereby said extract possesses a high degree of consumer acceptance.

6. A coffee extraction process for producing coffee extracts by contacting progressively fresher coffee grounds counter-currently with an aqueous extraction liquor which comprises admitting extraction liquor at 300° F.–320° F., to a washing section of an extraction train containing nearly spent grounds at the liquor inlet end, withdrawing partially concentrated extraction liquor from said washing section after 40–90 minutes, passing said partially concentrated extraction liquor at temperature of 280° F.–300° F. through a cooling section of said extraction train, withdrawing extraction liquor from said cooling section, at temperature of 250° F.–265° F. after 25–50 minutes, passing said extraction liquor through an extracting section of said extraction train, withdrawing extraction liquor having a concentration of 8%–12% coffee solubles at temperature of 150° F.–180° F. after 40–100 minutes, and maintaining the water ratio in said percolation train between about 5.4 and 6.9 parts of water per part by weight of the coffee whereby said extract possesses a high degree of consumer acceptance.

7. A coffee extraction process for producing coffee extract by contacting progressively fresher coffee grounds counter-currently with an aqueous extraction liquor which comprises admitting extraction liquor at 309° F. to a washing section of an extraction train containing nearly spent grounds at the liquor inlet end, withdrawing partially concentrated extraction liquor from said washing section after 75 minutes, passing said partially concentrated extraction liquor at temperature of 290° F. through a cooling section of said extraction train, withdrawing extraction liquor from said cooling section at temperature of 260° F. after 30 minutes, passing said extraction liquor through an extracting section of said extraction train, withdrawing extraction liquor having a concentration of 8%–12% coffee solubles at temperature of 175° F. after 60 minutes, and maintaining the water ratio in said percolation train between about 5.4 and 6.9 parts of water per part by weight of the coffee whereby said extract possesses a high degree of consumer acceptance.

References Cited in the file of this patent

"Tea and Coffee Trade Journal," November 1956, page 60.

"Tea and Coffee Trade Journal," November 1958, pages 23, 62 and 63.